March 13, 1962 R. F. GEIGER 3,025,208
APPARATUS FOR METAL ADHESIVE BONDING
Filed Aug. 1, 1957 9 Sheets-Sheet 1

INVENTOR
Robert F. Geiger
BY Strauch, Nolan & Neale
ATTORNEYS

March 13, 1962 R. F. GEIGER 3,025,208
APPARATUS FOR METAL ADHESIVE BONDING
Filed Aug. 1, 1957 9 Sheets-Sheet 2

INVENTOR
ROBERT F. GEIGER

BY Strauch, Nolan & Neale

ATTORNEYS

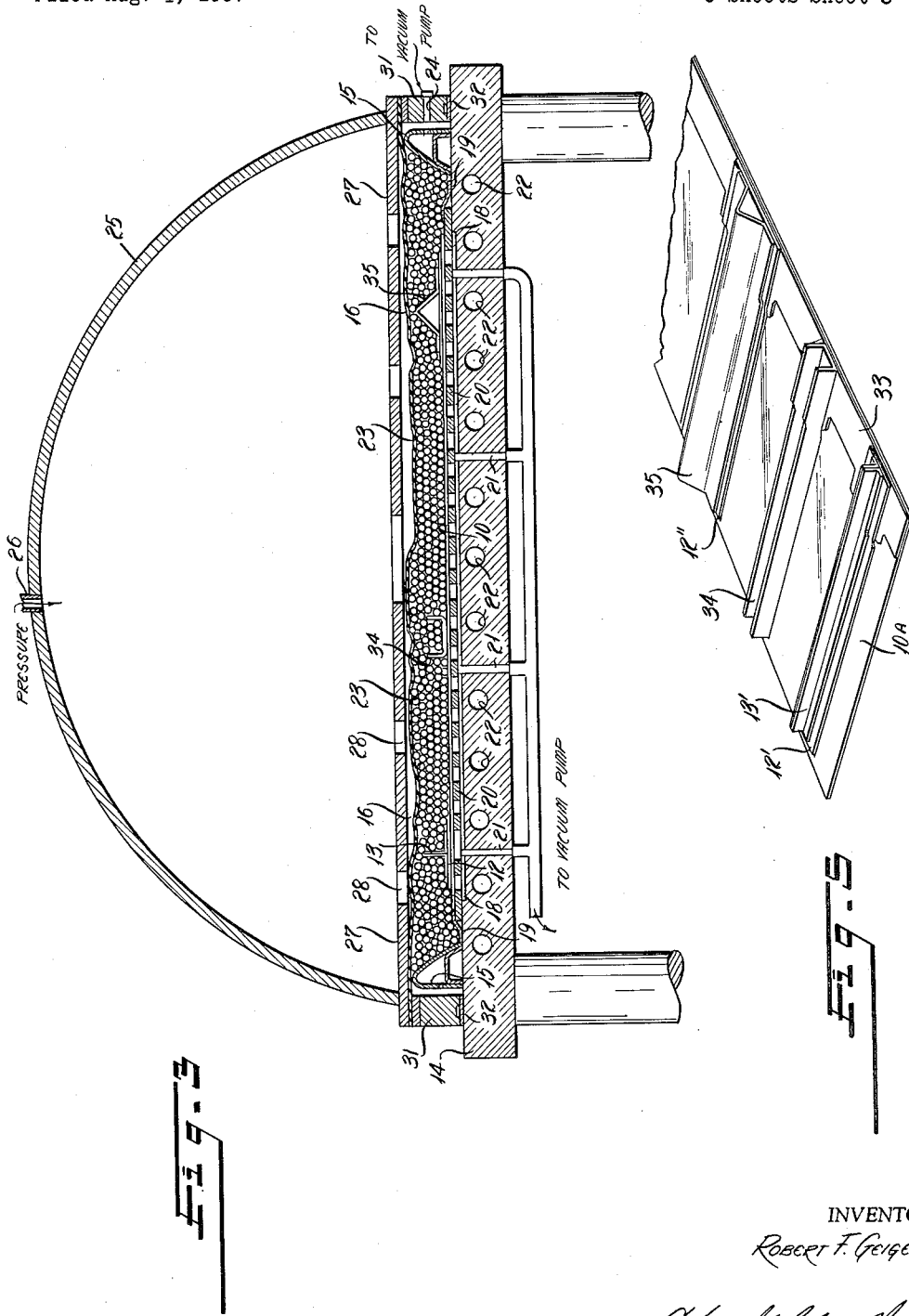

March 13, 1962 R. F. GEIGER 3,025,208
APPARATUS FOR METAL ADHESIVE BONDING
Filed Aug. 1, 1957 9 Sheets-Sheet 4
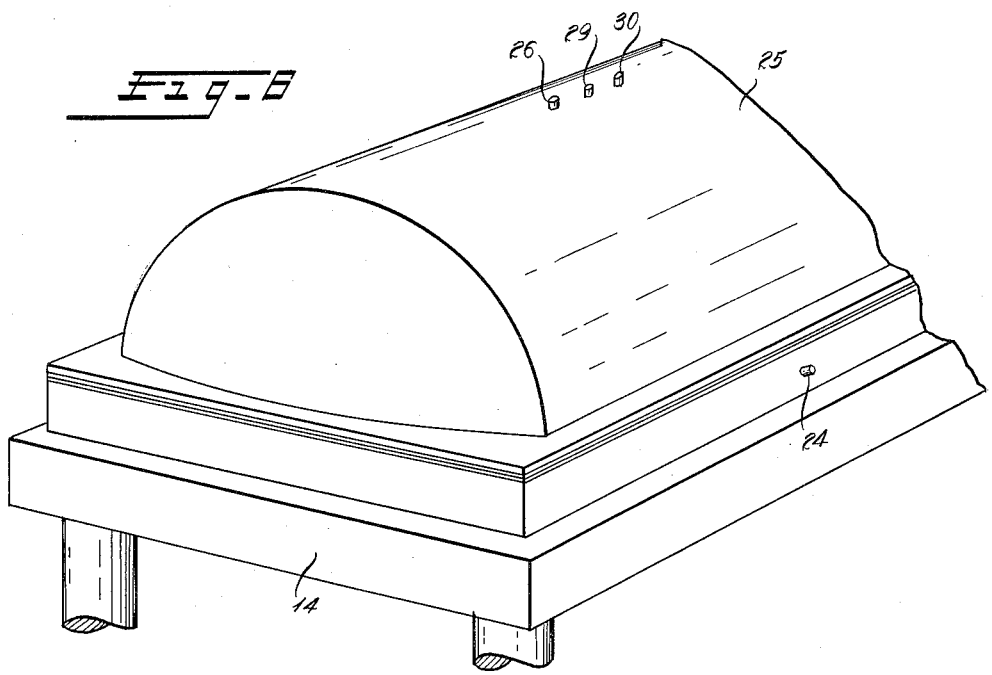
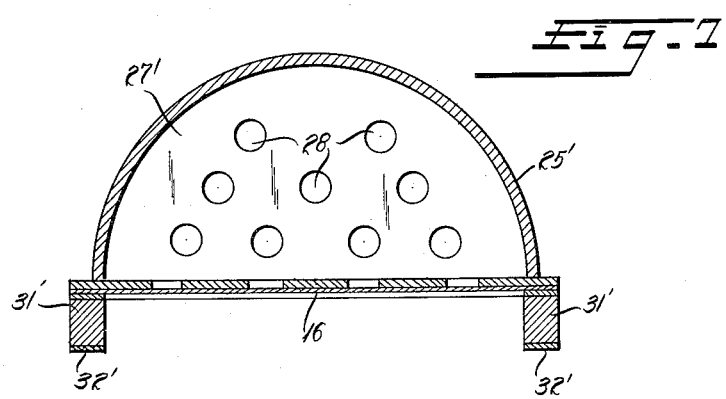
INVENTOR
ROBERT F. GEIGER
BY Strauch, Nolan + Neale
ATTORNEYS

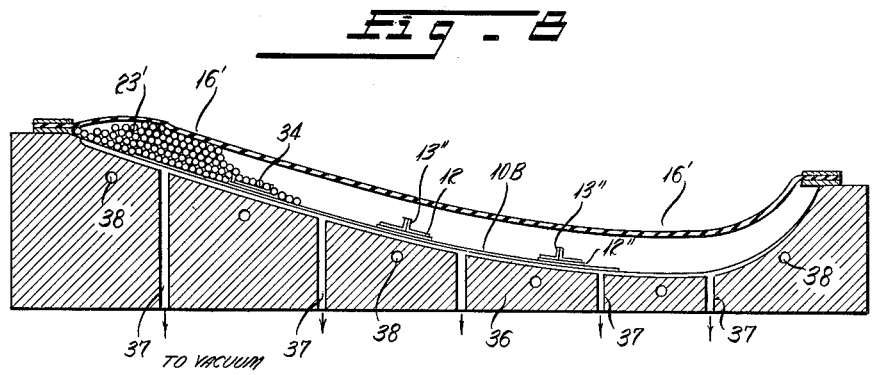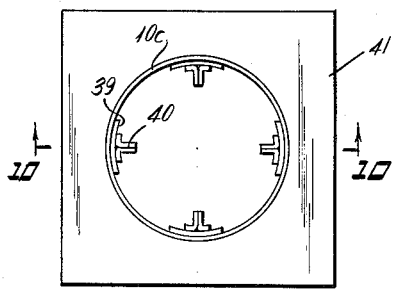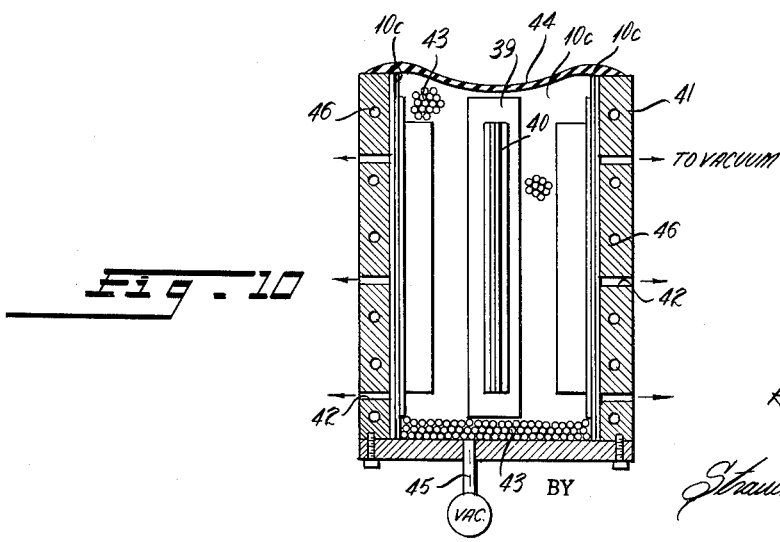

March 13, 1962  R. F. GEIGER  3,025,208
APPARATUS FOR METAL ADHESIVE BONDING
Filed Aug. 1, 1957  9 Sheets-Sheet 6

INVENTOR
ROBERT F. GEIGER
BY Strauch, Nolan & Neale
ATTORNEYS

March 13, 1962 R. F. GEIGER 3,025,208
APPARATUS FOR METAL ADHESIVE BONDING
Filed Aug. 1, 1957 9 Sheets-Sheet 7

INVENTOR
Robert F. Geiger
BY
Strauch, Nolan & Neale
ATTORNEYS

INVENTOR
ROBERT F. GEIGER

BY Strauch, Nolan & Neale

ATTORNEYS

March 13, 1962 R. F. GEIGER 3,025,208
APPARATUS FOR METAL ADHESIVE BONDING
Filed Aug. 1, 1957 9 Sheets-Sheet 9
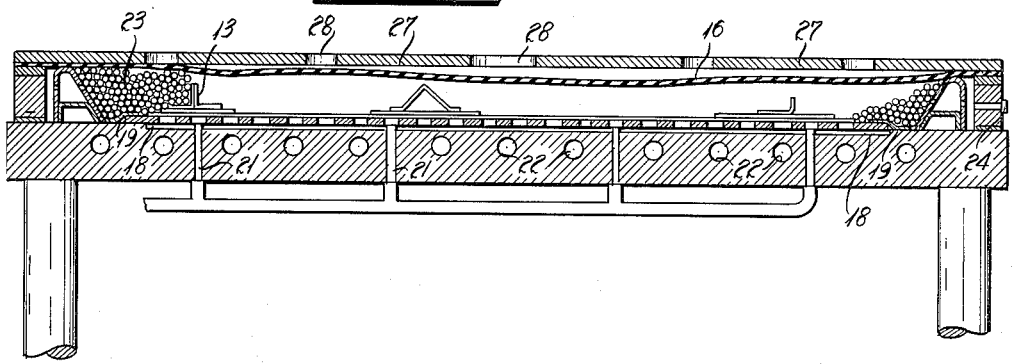
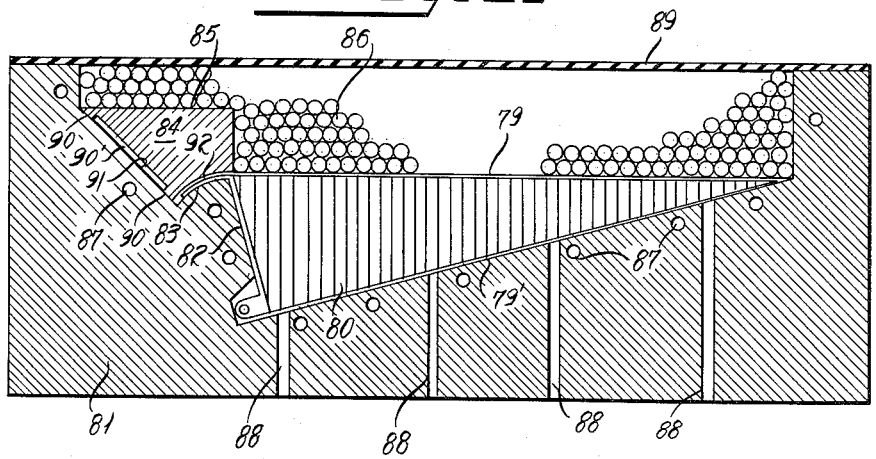
INVENTOR
ROBERT F. GEIGER
BY Strauch, Nolan & Neale
ATTORNEYS 3,025,208
Patented Mar. 13, 1962

3,025,208
APPARATUS FOR METAL ADHESIVE BONDING
Robert F. Geiger, P.O. Box 2507, Cheektowaga, N.Y.
Filed Aug. 1, 1957, Ser. No. 675,705
10 Claims. (Cl. 156—382)

This invention relates to improvements in the apparatus and methods for adhesively bonding metal to metal. Metal bonding has become a common practice, particularly in the aircraft industry in recent years.

The advantages achieved by bonding metal to metal by means of pressure temperature curing adhesives are many. Adhesive bonding permits use of thinner materials than can be effectively riveted, therefore, it is a great weight saver. In high speed aircraft, adhesive bonding provides a smoother skin surface than is otherwise obtainable, the smoother surface being more desirable for aerodynamic reasons. Fatigue characteristics of adhesive bonded joints are improved over those of other types. Because no drilling is required, the chances for stress concentration failures are minimized. Further, the adhesives provide filled spaces between contacting surfaces and thus act as an insulator between any dissimilar metals. In production methods, adhesive bonding permits the joining of large areas in one operation.

In general, in the aircraft industry, a large number of the metal parts to be bonded together by adhesive means comprise a doubler plate and stiffener bonded to a surface of a thin face skin. Other members finding wide usage are honeycomb cellular core structures bonded to a surface of a thin face skin. To accomplish the above results, the adhesive is applied to the surfaces of the metal members to be bonded together in the form of either a coating and/or an adhesive tape, such forms being well known in the art. All of the components are then positioned in assembled relationship. In order to cure the adhesive, it is necessary to apply pressure and temperature to the assembled components.

Prior to the present invention it has been the practice to apply pressure to the assembled components by means of a metal tooling overlay. The tooling overlay is machined to conform as exactly as possible to the actual bonding surface area. These tooling overlays are made to extremely close tolerances with special emphasis on flatness, depth of steps to accommodate joggles, etc. A shallow spot of only .001–.002 of an inch will show up as a low pressure area in the bonded assembly.

These low pressure areas result in an incomplete and weak bond of the adhesive of corresponding size to the area of the shallow spot. The article being manufactured thus has a weak bond for every shallow spot in the tooling overlay. The only way to detect the areas of weak bond is by destructive methods. Quality control is extremely important, thus a liberal number of test specimens are taken from a production run and examined for good bonding by separation of the members bonded together. Even with the extensive and high degree of precautions taken, the articles which pass strength tests of high tolerance may go into use having areas of weak bond caused by applying a pressure which was not uniform throughout the area between the members being bonded together.

Low pressure areas also result in variations in thickness between like parts and variations in thickness within a given piece. For example, variations in thickness between like parts occur when the tooling overlay is not in exactly the same relative position to the members being bonded together in each bonding operation. As a practical matter, it is of course impossible to place the tooling overlay in exactly the same position in successive operations.

Variations in thickness within a given piece are caused by the increased pressure at the high spots making a thinner section than were the shallow spots occur. Since the pressure at the shallow spots is less, the members in that area are not forced together as closely and a thicker section results.

These variations make it exceedingly difficult to produce a finished product within the necessary tolerances which are generally from ±.002 to ±.005 inch. It is an expensive article to manufacture and tests must be frequently made to determine if it is still within its required tolerance. Its use is of course limited to the particular member for which it is designed to apply pressure.

Further, when a plurality of parts are being bonded to a single skin, if a part, the thickness of which approaches the minimum intolerance thickness dimensions, lies between a pair of parts the thicknesses of which are greater, the metal overlay will in effect bridge the thinner intermediate part so that little pressure will be applied to it during the bonding process. The result will be little or no strength in the bond between the intermediate part and the skin. This problem becomes extremely critical when two or more superimposed members are being bonded together and to a skin simultaneously because of the cumulative effect of the intolerance variations in the thickness of each of the metal parts and of the tape which is interposed between the metal surfaces to be bonded. While the tolerances on the thickness of the tape and of the metal parts are maintained relatively close in production, these normal commercial intolerance variations result in incomplete bonds.

Because of the foregoing problems, it has been found necessary to prefit all parts prior to assembly. That is, the thickness of all parts must be checked by hand and the parts of like thicknesses grouped together to form an assembly. This is a very time-consuming and expensive operation itself and after this prefitting, the parts of each assembly must be tagged for identity throughout the entire process to assure that the ultimate assembly of the unit will include the parts designated for that assembly in the prefitting operation.

With the foregoing considerations in view, it is the primary object of the present invention to provide an improved metal adhesive bonding apparatus and method by which a complete bond throughout the entire area of adhesive is assured.

An object of this invention is to provide an economical means for applying uniform pressure to metal members of varying configurations being bonded together by pressure temperature curing adhesives.

Another object of this invention is to provide apparatus for applying uniform pressure to members of varying configuration which are being bonded together with a pressure curing adhesive, the apparatus utilizing a pressure applying means comprising a multiplicity of discrete flowable solid particles confined in a compartment, the particles being subjected to pneumatic pressure by means of an elastic blanket, whereby the particles transmit a uniform pressure to the members being bonded together.

A further object of this invention is to provide a novel means of applying heat and pressure to a pressure temperature curing adhesive by passing an electrical current through metal particles which apply the required pressure to the adhesive disposed between the members being bonded together, the necessary heat being generated by the electrical current passing through the metal particles.

Still another object of this invention is to provide a novel method of bonding together metal members with a pressure temperature curing adhesive by applying a uniform pressure throughout the adhesive area by means of a multiplicity of discrete flowable solid particles which are subjected to pneumatic pressure by means of an elastic blanket.

Other objects of the invention will, in part, be obvious, and will, in part, appear hereinafter.

For a fuller understanding of the nature and objects of the invention, reference should be had to the following detailed description and drawings, in which:

FIGURE 3 is a transverse sectional view of a table assembly illustrating a modification of the invention;

FIGURE 5 is a perspective view illustrating different forms of stiffening members bonded to a surface skin;

FIGURE 6 is a perspective view of the table assembly of FIGURE 3;

FIGURE 7 is a transverse sectional view of another form of construction for the dome illustrated in FIGURE 6;

FIGURE 8 is a transverse sectional view of part of a table assembly illustrating another modification of the invention;

FIGURE 9 is a top plan view of a platen illustrating another embodiment of the invention;

FIGURE 10 is a view taken along the line 10—10 of FIGURE 9;

FIGURE 18 is a cross sectional view of a pressure cooker illustrating another modification of the apparatus shown in FIGURE 15;

FIGURE 19 is a transverse sectional view of a table assembly illustrating a modification of the apparatus shown in FIGURE 3; and FIGURE 20 is a cross sectional view of a platen assembly illustrating another embodiment of the invention.

Figure 2:
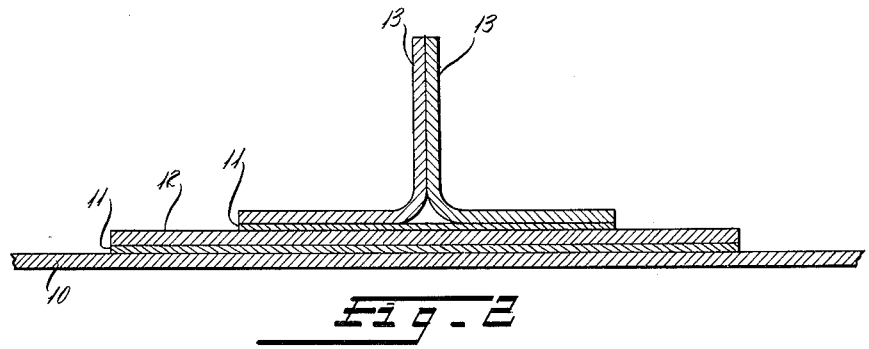
FIGURE 2 is a cross sectional view through a stiffener and doubler bonded to a skin.

Referring to FIGURE 2 of the drawings, there is illustrated a detailed sectional view of a typical angle stiffener and doubler bonded to a surface skin. The surface skin 10 is of the usual type found in the aircraft industry and is an aluminum or magnesium sheet in the order of $\frac{1}{32}$ inch thick. A doubler member 12 is bonded to the skin 10 by means of a pressure temperature curing adhesive 11. Angle stiffener members 13 are bonded to the doubler member 12 by means of adhesive 11.

The pressure temperature curing adhesives used in this invention are well known in the art. They may be applied in the form of a resin impregnated tape or sprayed upon the members at the surfaces to be bonded together or a combination of spray coating and tape.

An example of an adhesive spray is a thermosetting phenolic-neoprene-nylon resin liquid solution containing 10% by weight resin solids. Such a resin is available to the market as "Boeing BMS–5–15" or "5–20." The tape may be a nylon fabric impregnated with the same thermosetting resin in the B-stage. Epoxy resins are used as both spray and tape for high temperature applications.

In the use of the pressure temperature curing adhesive resins, a pre-established maximum time cycle between operations is observed for each particular resin. Maximum shelf life is assured by storing the adhesive in air-tight refrigerated containers until it is to be used.

Before the adhesives are applied to the surfaces of members to be bonded together, the surfaces must be thoroughly cleaned and treated to develop a "keying" surface for the adhesive. For aluminum, treatment comprises a vapor degrease, then rinsing clean in an alkaline bath followed by water, and then etching the surface with a sodium dichromate-sulfuric acid bath which coats the surface with an oxide.

In practice, two coats of liquid adhesive are generally sprayed on each of the surfaces to be bonded together, each coat having a thickness of from .001 to .002 inch. The resin impregnated nylon tape which is positioned between the surfaces to be bonded together may have a thickness of .008 to .015 inch. The total thickness of adhesive coat and tape after bonding is about .011 inch.

For a detailed description of a method of treating magnesium, reference may be had to the book "Magnesium Finishing," published by Dow Chemical Company, Midland, Michigan (copyright 1952, 1955), pages 50 to 58, chapter entitled "Chemical Treatment No. 7."

The pressures and temperatures used in curing these adhesives vary with the metals to be bonded together and of course the particular adhesive used. For example, in bonding magnesium to magnesium with the thermosetting phenolic-neoprene-nylon above, a temperature of from 310° F. to 340° F. at a pressure of from 7.5 to 50 p.s.i. is used. Magnesium to aluminum requires a temperature of 310° F. to 340° F. at a pressure of from 25 to 50 p.s.i. Aluminum to aluminum requires a temperature of 325° F. to 350° F. at a pressure of from 25 to 150 p.s.i.

In general, in curing the adhesives, full pressure is gradually applied and heat is then brought to curing temperature at a gradual rate not exceeding a rise of 12 degrees per minute. The pressure is applied before the heat so there will be no shifting of parts when the adhesive softens during the curing operation. The temperature of the adhesive is recorded by thermo-couples inserted at the adhesive line between the members being bonded together. When the curing temperature is reached, it is held for 30 minutes to complete the cure. At the end of the cure cycle, the press is cooled by circulating cold oil through the heating coils and after the temperature of the adhesive has dropped below 180° F., the press is opened and the assembly removed. Above a temperature of 180° F., the adhesive is still semi-plastic and any movement may shift the exactingly positioned detail parts.

An important feature of this invention resides in the novel means for applying a uniform pressure to the adhesive during the curing cycle. This is accomplished by completely surrounding or engulfing the parts to be bonded together by a multiplicity of free-flowing discrete particles such as B-B shot, similar size hollow balls such as are used in forming key chains or the like, which are confined in a formed compartment. Pressure is transmitted to the particles or balls by means of an elastic blanket covering a surface of the confined balls, and the balls in turn transmit uniform pressure to the parts to be bonded together. Where the particles used are balls, the radius of the balls is preferably substantially equal to or less than the smallest fillet radius of curvature or arc of the members to be bonded to the surface skin. This is to assure uniform pressure at all points, especially at the corners of the members. Thus members of varying size and shape may be bonded together in the same operation. It is to be understood of course that substantially uniform pressures may be obtained by using balls of slightly larger size than the smallest angle.

A convenient means for removing the particles or balls from the compartment after the bonding operation is to suction them out by means of vacuum apparatus.

In most applications, the particles are preferably substantially spheroid or ball like in shape and may be of any suitable material such as glass, plastic, wood, metal or other hard materials. In some applications, the particles may be of a material such as sand. The essential characteristics of the particles are that they be free-flowing, discrete, and have a hardness which will withstand the temperatures and pressures incurred during the bonding operation. Of the metal materials, steel, brass, and aluminum give good results because of their thermal conductivity; however, aluminum is preferred because of its low weight and consequent easy handling. Further weight is saved when the particles are hollow and they are also easier to heat. As will be hereinafter described with reference to a particular embodiment of the invention, the particles are of a metal or an alloy such as "Nichrome" which will generate heat when an electrical current is passed therethrough.

Figure 1:
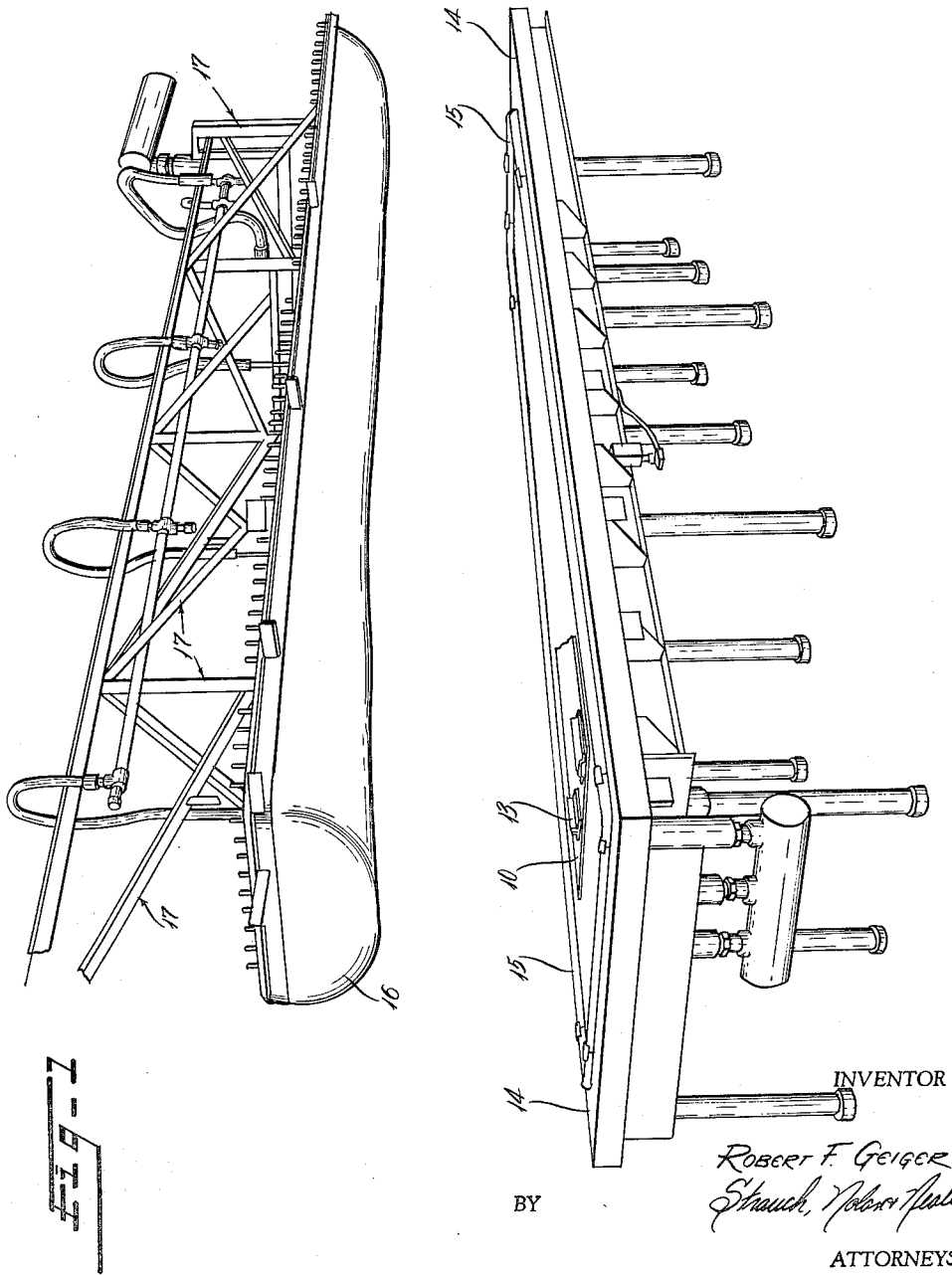
FIGURE 1 is a perspective view illustrating a complete apparatus in which the new bonding process may be practiced.

Referring now to FIGURE 1 of the drawings, there is shown a table 14, details of which will be described hereinafter. Mounted on the top surface of the table 14 is a particle retaining ring 15. Components to be bonded together such as illustrated in FIGURE 3 of the drawing and comprising surface skin 10 and stiffener members 13 are assembled on a perforated aluminum "cookie sheet" (not shown). A uniform layer of pressure temperature curing adhesive (not shown) is disposed between the surfaces of the members to be bonded together. The space enclosed by the particle retaining ring 15 forms a compartment which is filled with tiny particles (not shown) so as to engulf the members to be bonded together. An elastic blanket 16 of rubber, or the like, mounted on a rack 17 is lowered to the level of the table 14 so that the blanket completely covers the particles and the retaining ring 15. A vacuum is applied under the blanket 16 to remove the volatiles resulting from curing of the adhesives and to provide substantially one atmosphere of pressure on the particles, which pressure in turn is transmitted by the particles to the adhesive disposed between the surfaces of the members being bonded together. Heat is transmitted through the table 14 by means of heating coils (not shown) whereby a cure of the adhesive by heat and pressure is effected.

Figure 4:
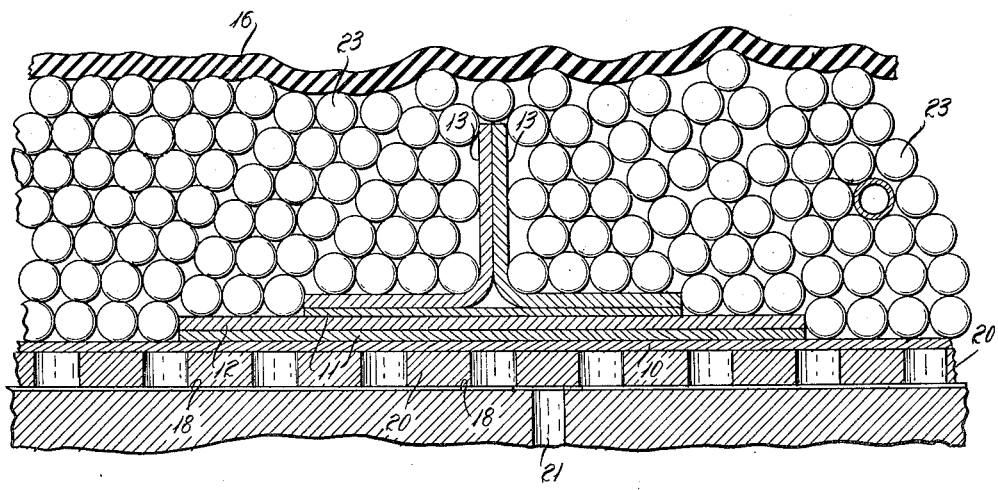
FIGURE 4 is a transverse sectional view taken through a portion of the table of FIGURE 3 illustrating the detailed relation between the table, "cookie sheet," stiffeners and doublers bonded to a skin, balls and elastic blanket during the bonding process.

Illustrated in FIGURE 3 of the drawings is a slight modification of the apparatus shown in FIGURE 1. The apparatus in FIGURE 3 is the same as that shown in FIGURE 1 except that a means (to be hereinafter described) is provided to apply pneumatic pressure to the elastic blanket 16 as well as a vacuum under it. FIGURE 4 illustrates in detail the assembled relation of the doubler 12 and stiffeners 13 in FIGURE 2 during the bonding operation. The table 14 has a recessed portion 18 in the top surface thereof extending substantially the length and width of the table. Mounted over the recessed portion 18 by means of clamps 19 is a perforated "cookie sheet" 20. Surface skin 10 is held flatly against the "cookie sheet" 20 by means of a vacuum applied through pipes 21 leading to the recessed portion 18. Tubes 22 circulate through the table 14 and provide means for circulating either a heating fluid or a cooling fluid as required in different stages of the bonding operation. Balls 23 completely engulf the assembled components and are confined in their compartment by retaining ring 15. Pressure is applied to the balls 23 by the blanket 16. As is clearly shown in FIGURE 4 of the drawings, the balls 23 transmit a uniform pressure throughout the area of adhesive 11 disposed between the surfaces of the members being bonded together. The balls 23 further force the back to back arms of stiffeners 13 tightly together more uniformly than is possible with a tooling overlay.

In the embodiment shown in FIGURE 3, pressure may be applied in two ways. By applying a vacuum to the underside of blanket 16 through pipe 24, the blanket 16 applies pressure to the balls 23 and compresses them into their smallest volume. The vacuum applied through pipe 24 further acts to exhaust solvents and polymerization products which are liberated during the curing of the adhesives, thereby preventing air pockets in the adhesive bond. Additional pressure is applied to the blanket 16 by means of a pressure dome 25. This is accomplished by pumping compressed air through inlet 26. In order that dome 25 will have sufficient strength to withstand the pressure applied therein, it is provided with a structural sheet 27 having perforations 28 therein. The sheet 27 acts as a brace and the perforations allow a free passage of air therethrough to apply pressure to the blanket. It will be understood of course, that other types of strengthening means for dome 25 may be utilized as for example a transverse sectional form of structural sheet 27' having perforations 28' as illustrated in FIGURE 8 of the drawings. A plurality of members 27' may be spaced along the length of dome 25' as required in proportion to the pressure used. A pressure gage (not shown) and a bleeder valve (not shown) are connected to lead-in pipes 29 and 30 respectively in FIGURE 7 of the drawings. In order to assure an air-tight seal between the domes 25 and 25' and table 14, domes 25 and 25' are mounted on a frame 31 and 31' respectively which has, mounted on the edge thereof a rubber or the like sealing strip 32 and 32' as shown in FIGURES 3 and 7 respectively of the drawings.

Illustrated in FIGURE 19 of the drawings is the same apparatus as shown in FIGURE 3 of the drawings except that the pressure dome 25 of FIGURE 3 has been omitted. Without the pressure dome 25 only atmospheric pressure can be applied to the blanket 16 by means of the vacuum pump connected to inlet 24. This form of apparatus is used in bonding members with adhesives that require low pressures not exceeding that of atmospheric.

In FIGURE 5 of the drawings, there are a number of different types of stiffener members that may be bonded to a surface skin 10A. In this illustration an additional doubler 33 is provided at the edge of the surface skin 10A. Doubler 12' and stiffeners 13' are bonded in the same manner as shown in FIGURE 3 of the drawings. A U-shaped channel member 34 is bonded directly to the surface skin 10A without the use of a doubler. An inverted V-channel stiffener 35 is another type among many which may be used. Stiffener 35 is bonded to a doubler 12" in the same manner as the other members were bonded to the skin 10 as described hereinbefore. Regardless of the size and shape of the stiffener members, a uniform pressure is distributed over surfaces thereof by the particles.

The stiffeners, doublers, and skins are all manufactured to close tolerances. In general, the stiffeners and doublers have a thickness of from .037 to .045 inch thick with tolerances of from ±.002 to ±.005 inch. The skins are usually .016 to .031 inch thick.

In FIGURE 8 of the drawings there is shown apparatus for bonding stiffeners 13" and doublers 12" to a curved skin 10B. In this particular embodiment of the invention, a "cookie sheet" is not used. The curved surface of the platen 36 substitutes for the "cookie sheet" and the pressures transmitted by the balls 23' flatten skin 10B against the surface of the platen 36. A vacuum is also applied through pipes 37 in order that the skin 10B will be held firmly in place against the surface of platen 36 after it has been positioned. The platen 36 is heated and cooled as desired by circulating tubes 38 which extend therethrough. Pressure may be applied to the elastic blanket 16' by a suitable hood structure such as illustrated in FIGURE 6 of the drawings and adapted for this particular modification where one side of the platen 36 is lower than the other. Pressure applied to the blanket 16' is in turn transmitted through the balls 23' to the adhesive (not shown) disposed between the members being bonded together.

In FIGURES 9 and 10 of the drawings, there is shown apparatus for bonding doublers 39 and stiffeners 40 to a cylindrical skin 10C. The platen 41 may be of one piece as shown, or it may be of sections which are joined together after the cylindrical sheet 10C is assembled therein. The cylindrical sheet 10C is firmly held against the surface of platen 41 by means of vacuum pipes 42 as shown in FIGURE 10 of the drawings. The compartment formed inside platen 41 is filled with tiny balls 43. The open end of platen 41 is then covered with an elastic blanket 44. A vacuum is then applied in the ball filled compartment through pipes 45 and the blanket 44 thereby subjects the balls 43 to atmospheric pressure. The balls 43 in turn transmit this pressure to the stiffener members 40 and doubler members 39 and the adhesive disposed therebetween. Coils 46 circulate through platen 41 to heat and cool the platen as required, as hereinbefore described.

Figure 11:
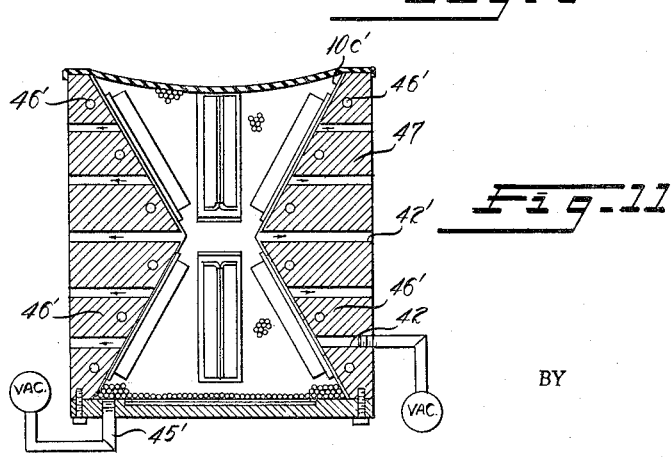
FIGURE 11 is a transverse sectional view illustrating a modification of apparatus shown in FIGURE 10.

The embodiment of the invention illustrated in FIGURE 11 of the drawings is the same as that shown in FIGURES 9 and 10, except that platen 47 is of a different configuration. As shown in FIGURE 11 of the drawings, skin 10C' is somewhat in the nature of a venturi or hourglass configuration. In the aircraft industry, and particularly the rocket field, space is at a premium and it is often necessary to design structural members of irregular shape so that all of the necessary components may be assembled in the rocket. The platen 47 is heated and cooled as required by coils 46' as hereinbefore described. Vacuum is applied through pipes 42' and 45' as hereinbefore described.

Figure 12:
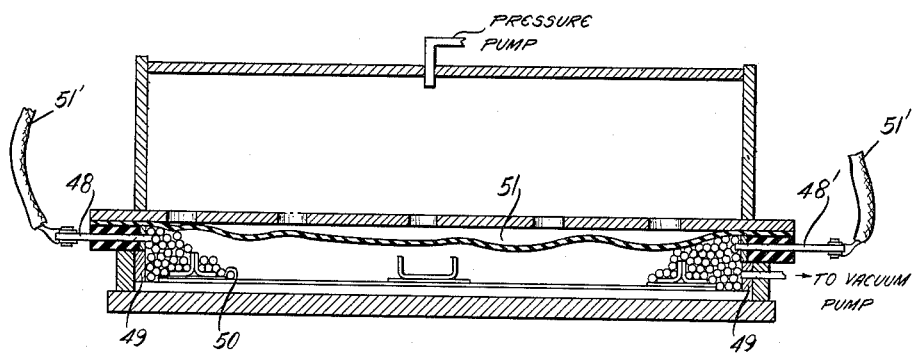
FIGURE 12 is a transverse sectional view of a table assembly illustrating another embodiment of the invention in which a novel electrical heating means is utilized.

Illustrated in FIGURE 12 of the drawings is another embodiment of the invention. In this particular embodiment, electricity is used as a heating means for curing the adhesives. Electrodes 48 and 48' are mounted so as to extend through the retaining wall 49, and be in electrical contact with balls 50. The balls 50 in this particular instance are of any suitable material such as "Nichrome" which is a conductor of electricity and will generate heat when an electrical current is passed therethrough. An electrical current is passed through the balls 50 by means of the electrical leads 51 and 51' connected to electrodes 48 and 48' respectively. The electrical current passed through the balls 50 is in an amount sufficient to generate enough heat to cure the adhesives disposed between the assembled parts to be bonded together. Pressure is applied to the balls 50 by means of the elastic blanket 51 in the same manner as hereinbefore described.

Figure 13:
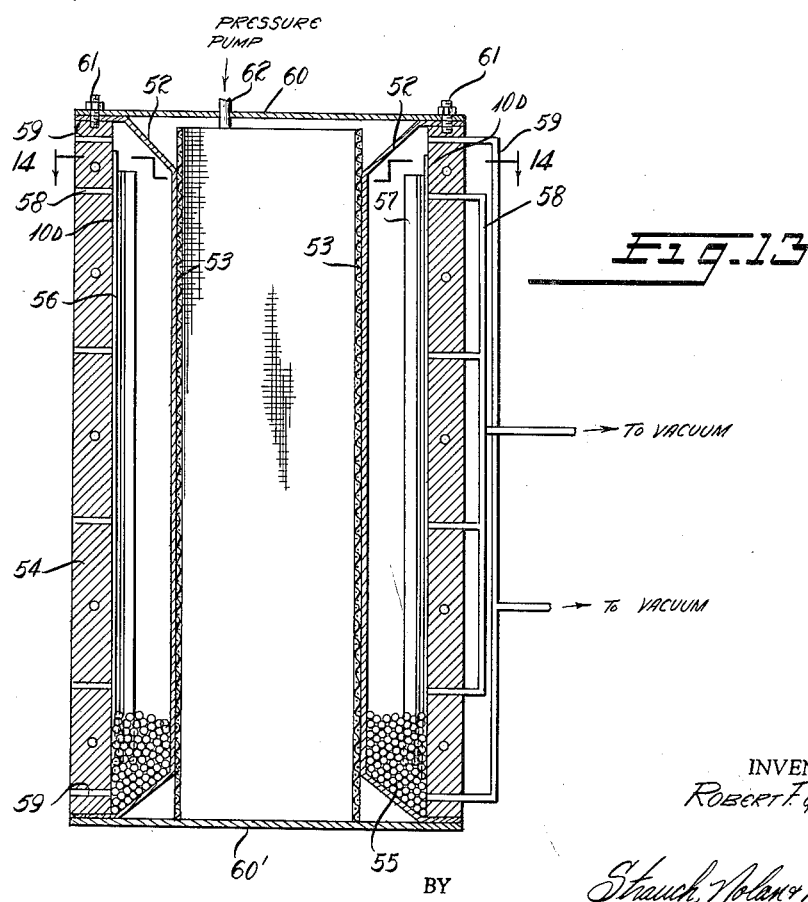
FIGURE 13 is a transverse sectional view of a platen assembly illustrating another embodiment of the invention.
Figure 13:
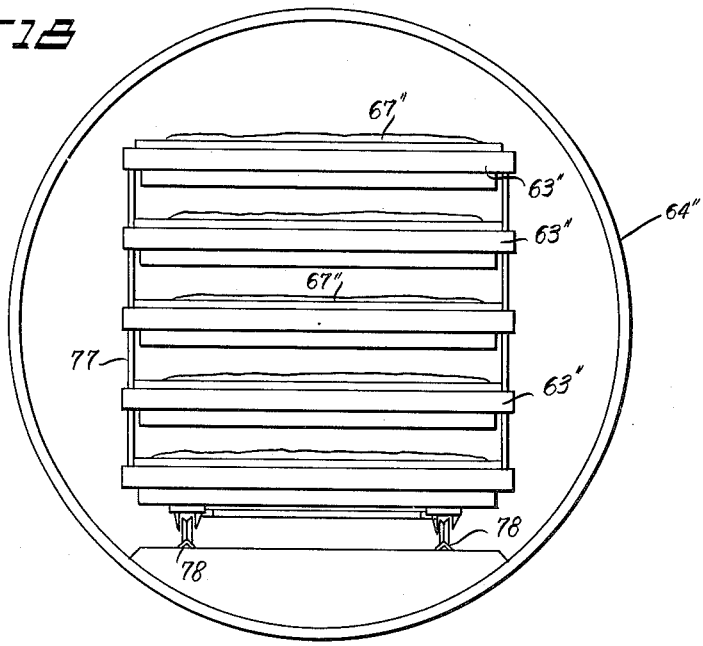
Figure 14:
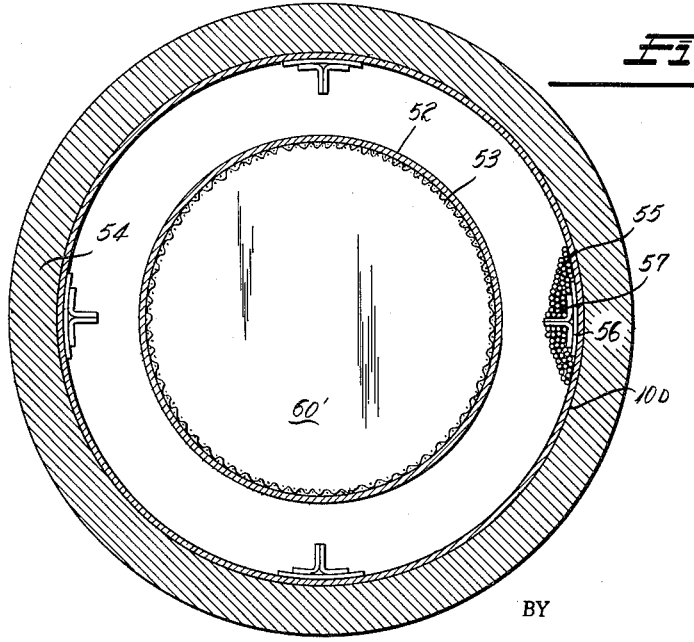
FIGURE 14 is a view taken along the line 14—14 of FIGURE 13.

Illustrated in FIGURES 13 and 14 of the drawings is another modification of the invention similar to that shown in FIGURES 9 and 10 of the drawings. In this particular modification, elastic blanket 52 is tubular or cylindrical in form and is stretched over a tubular or cylindrical wire frame 53. The diameter of wire frame 53 is smaller than that of platen 54, so that the assembly will fit in tubular or cylindrical platen 54 and provide a space for balls 55 between the blanket 52 and the assembled skin 10D and stiffeners 57 and doublers 56. As shown in FIGURE 13 of the drawings, there are two sets of vacuum pipes 58 and 59 respectively. Vacuum pipes 58 hold the cylindrical skin 56 firmly against the surface of platen 54. Vacuum pipes 59 lead directly to the compartment in which balls 55 are confined. Vacuum pipes 59 cause elastic blanket 52 to expand radially and transmit pressure through balls 55 to the components being bonded together. As shown in FIGURE 13 of the drawings, cover 60 is removable by means of bolts 61. All of the necessary components to be assembled in platen 42 may be introduced therein by the opening formed by removable cover 60. Blanket 52 is of sufficient length that its ends may be clamped between the ends of platen 54 and end covers 60 and 60', thereby forming an air-tight compartment. Additional pressure may be applied to blanket 52 by pumping compressed air through pipe 62 into the compartment formed by the blanket 52 on the wire frame 53.

Figure 15:
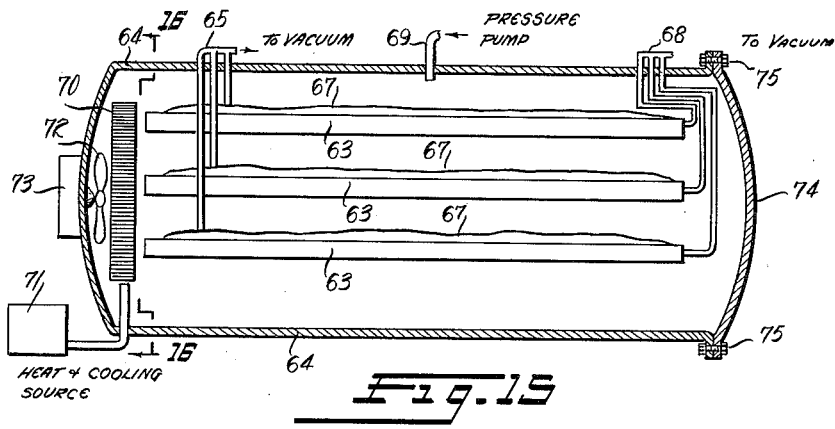
FIGURE 15 is a transverse sectional view of a pressure cooker illustrating another embodiment of the invention.
Figure 16:
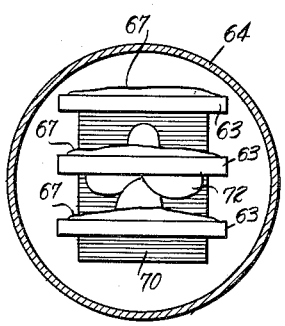
FIGURE 16 is a view taken along the line 16—16 of FIGURE 15.

Illustrated in FIGURES 15 and 16 of the drawings is another modification of the invention in which a plurality of table type platens 63 are mounted by means (not shown) in a pressure cooker 64. The table type platens 64 are of the same construction as those illustrated in FIGURES 3 and 4 of the drawings. Pipes 65 provide a vacuum under the blankets 67. Pipes 68 provide a vacuum under a skin (not shown) to hold the skin in contact with a "cookie sheet" (not shown) all details of which are illustrated in FIGURES 3 and 4 hereinbefore described. Pneumatic pressure is provided in the pressure cooker through lead in pipe 69. The necessary heating and cooling of pressure cooker 64 is accomplished by means of a radiator 70, which is connected to a heating and cooling source 71. A fan 72 driven by motor 73 blows air through the radiator 70 in order that the pressure cooker 64 will be uniformly heated or cooled, as required during the bonding process. Access into the pressure cooker 64 is through removable cover 74 held in place by bolts 75.

Figure 17:
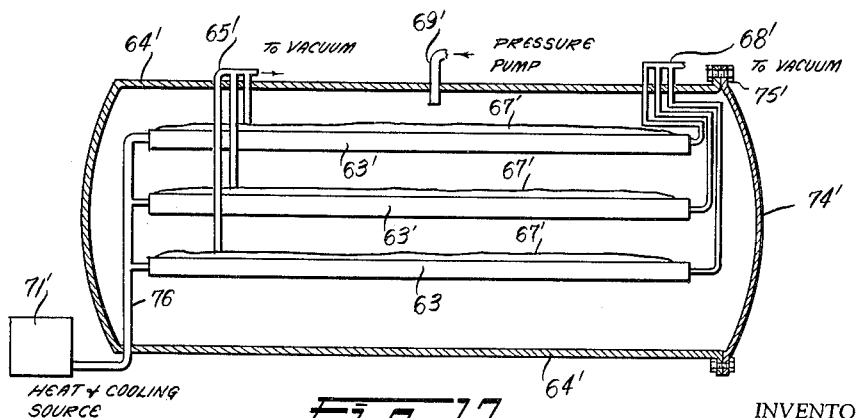
FIGURE 17 is a transverse sectional view of a pressure cooker illustrating another modification of the apparatus shown in FIGURE 15.

Illustrated in FIGURE 17 of the drawing is a modification 64' of the pressure cooker 64 which is substantially the same as that illustrated in FIGURES 15 and 16. Here platens 63' are connected directly to a heating and cooling source 71' by means of pipes 76. Vacuum pipes 65' and 68' function in the same manner as those illustrated in FIGURE 16 of the drawing. In using the apparatus illustrated in FIGURES 16 and 18, the members to be bonded together are positioned on a "cookie sheet" (not shown) which is in turn introduced into the pressure cooker. After the "cookie sheet" with the members to be bonded together assembled thereon (not shown) has been positioned on either the platens 46 or 53, the bonding operation is carried out exactly as described in connection with the apparatus of FIGURES 4 and 5.

Illustrated in FIGURE 18 of the drawing is another modification of the invention is which a pressure cooker 64" has an arrangement whereby a plurality of platens 63" are mounted on a frame 77 which may be rolled in and out of the pressure cooker 64" by means of tracks 78. It is to be understood, of course, that suitable vacuum lines (not shown) of sufficient length to allow the frame to be rolled in and out of the pressure cooker 64" must be provided. A suitable heating and cooling means (not shown in FIGURE 18) would be of the type illustrated in FIGURES 15 and 16 of the drawings.

In FIGURE 20 of the drawings, there is shown apparatus for bonding surface skins 79 and 79' to a cellular structure 80 such as a honeycomb type. In this particular embodiment, the article is an elevator for use on a wing of an aircraft. In the manufacture of articles such as aircraft elevators in which a cellular structure is incorporated, it is often desirable to apply more bonding pressure to one area than another or adjoining areas. For example, the pressure required to bond a skin to particular structural members may be enough to damage or crush the cellular structure or other types of members being bonded together in an adjoining area.

In the apparatus of FIGURE 20 there is a novel means for applying different pressures in different areas. As shown, a platen 81 is machined to conform to the size of one side of the elevator member. Top and bottom skins 79 and 79' are bonded both to the honeycomb 80 and to a structural member 82, which has a curved portion 83. In the elevator being manufactured, it is desired to apply more pressure to the curved portion 83 than is applied to the honeycomb structure 80. This is accomplished by means of a floating block 84, the area of top surface 85 being greater than an opposing area 92 mating with curved portion 83. Inclined side 90 of block 84 is in free sliding contact with mating inclined surface 91 of platen 81. A portion 90' is removed from side 90 to reduce the area of block 84 in contact with surface 91. It is desirable to have inclined surface 91 highly polished or lubricated in order to minimize friction. Thus proportionally greater pressure is applied along the surface 83 than is applied along the surface of the skins 79 and 79' being bonded to the honeycomb structure 80. The proportion of greater pressure is determined by the ratio of top surface 85 to area 92 and the angle of inclined surface 91 to the angle of tangent to the mid-surface of area 92. By varying these factors, a desired increased pressure may be applied to a specific area.

It is preferable that balls 86 be substantially the same size or smaller than the core of the honeycomb 80. This is to assure that a uniform pressure will be applied along the joints formed by the skins 79 and 79' and the cell edges of honeycomb 80. The platen 81 is heated and cooled by means of coils 87. Skin 79' is held firmly against the surface of platen 81 by means of vacuum pipes 88 and pressure is transmitted to balls 86 by means of elastic blanket 89 actuated by pneumatic means (not shown), all as hereinbefore described.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In an apparatus for adhesively bonding together a plurality of members with an adhesive which is cured by heat and pressure in which one of said members requires application of differing pressures to adhesively bond it in place, a pressure transmitting means for transmitting a uniform pressure to the adhesive disposed between the members to be bonded together, said pressure transmitting means comprising a multiplicity of free-flowing discrete particles confined in a compartment which is closed by a pressure applying means, rigid pressure varying means in said compartment for transmitting a different pressure to an area between members being bonded together, said pressure varying means having one surface area exposed to the particles, and an opposing surface area which is smaller than said one surface area and which is adapted to be in surface abutment with a selected surface portion of one of said members where a different pressure is required, the different pressure transmitted to said one member being proportional to the ratio of the area of the exposed surface to the opposing surface, at least a further surface portion of said one member being adapted to be exposed to said particles such that different pressures are concomitantly transmitted to separate selected portions of said one member.

2. In an apparatus for adhesively bonding together a plurality of members with an adhesive carrying tape the adhesive of which is cured by heat and pressure, a uniform pressure transmitting means for transmitting pressure to the adhesive of the tape disposed between the members to be bonded together, said pressure transmitting means comprising a mass of free-flowing substantially hollow spheroidal particles of equal size confined in a compartment which is closed by flexible pressure applying means for applying pressure to the confined particles, said particles forming a layer having one surface in uniform contact with said flexible applying means and an opposite surface adapted to be in uniform surface contact with the surface of one of said members opposite to the surface of said one member having said adhesive, said particles being of an electrical conducting material which will generate heat when an electrical current is passed therethrough, electrodes which are in electrical contact with the particles and electrical means connected to the electrodes for passing an electrical current therethrough to generate uniform heat throughout said mass sufficient to cure the adhesive.

3. In an apparatus for bonding a member to a thin sheet by a layer of pressure temperature curing adhesive interposed therebetween, a rigid firmly supported unitary frame, a rigid support platen supportingly seated only on said frame and having a metallic supporting surface which is of the same configuration as that of the sheet to which the member is to be bonded, said supporting surface being adapted to support said sheet in direct contact therewith, a plurality of openings in the supporting surface of said platen, means connecting said openings to an evacuating source to hold said sheet against the supporting surface of said platen when vacuum is applied in the openings, a particle retaining means disposed about said support platen, a multiplicity of free-flowing metal balls loosely disposed in said particle retaining means in direct contact with said sheet and said member and with each other, the number of balls being sufficient to completely cover the areas of the member and sheet to be adhesively bonded together to a depth to cover the member, a flexible blanket movably mounted so that one side thereof completely covers and is in direct contact with said balls to form with the sheet, an air tight compartment surrounding the balls when the blanket is so positioned, an evacuating means connected to the formed compartment to remove volatiles formed in curing of the adhesive and to reduce the fluid pressure on the compartment side of the blanket below that on the opposite side thereof, the flexible blanket thereby applying pressure to said balls when the formed air tight compartment is evacuated, and heating and cooling means embedded within said frame adapted to selectively heat said member and adhesive layer to the curing temperature of said adhesive and for subsequently cooling said adhesive to a solid state while pressure is applied thereto through the balls.

4. In an apparatus for bonding a member to a thin sheet by a layer of pressure temperature curing adhesive interposed therebetween, a rigidly mounted support platen having a supporting surface, the surface configuration of which is the same as that of the sheet to which the member is to be bonded, a plurality of openings in the supporting surface of said platen, means connecting said openings to an evacuating source to hold the sheet against the supporting surface of said platen when vacuum is applied to the openings, a particle retaining means disposed about said support platen, a multiplicity of free-flowing hollow metal balls disposed within said particle retaining means in direct contact with said sheet and member and with each other, the number of balls being sufficient to completely cover the areas of the member and sheet to be adhesively bonded together to a depth to cover the member, a flexible blanket movably mounted so that one side thereof completely covers and is in direct contact with said balls to form with the sheet an air tight compartment surrounding the balls when the blanket is so positioned, an evacuating means connected to the formed compartment to remove the volatiles formed in curing of the adhesive and to reduce the fluid pressure on the compartment side of the blanket below that on the opposite side thereof, the flexible blanket thereby applying pressure to said balls when the formed air tight compartment is evacuated, and heating means adapted to selectively heat said member and said sheets to the curing temperature of said adhesive while pressure is applied thereto through said balls, said heating means comprising electrodes which extend into said air tight compartment in electrical contact with said metal balls, and electrical means connected to the electrodes for passing an electrical current therethrough to generate heat sufficient to cure the adhesive.

5. The apparatus as defined in claim 1 wherein said pressure varying means is a wedged-shaped block.

6. The apparatus as defined in claim 3 wherein said elastic blanket and said base are provided with engageable freely separable surfaces which establish a continuous seal for said air tight compartment, and means for raising and lowering said flexible blanket to respectively engage and separate said surfaces and for applying sufficient pressure to said engaging surfaces to establish said seal, said blanket and said last named means being free of interlock relative to said base.

7. The apparatus as defined in claim 6 wherein said last named means comprises an air tight pressure compartment at the opposite side of said flexible blanket from the side of said elastic blanket exposed to said balls, pneumatic compressing means connected to said pressure compartment for applying super atmospheric pressure to that side of the blanket opposite the side adjacent to the balls, the blanket thereby establishing super atmospheric pressure in the mass of balls equal to the differential pressure across the blanket.

8. The apparatus as defined in claim 3 wherein the surface of said base facing said platen is recessed to form with said platen an evacuation chamber in fluid communication with the opening in said platen and passage means extending through said base for establishing fluid communication between said evacuating means and said evacuation chamber.

9. In an apparatus for adhesively bonding a reinforcing member to the surface of a thin metal sheet of material by curing a pressure-temperature curing adhesive bearing sheet compressed between said sheet and said member, a rigid firmly supported unitary frame, a rigid platen rigidly fixedly supported entirely on said frame and formed with an exposed metal surface which has the same configuration as that of the desired configuration of said thin sheet of material and which is adapted to rigidly support said thin sheet in direct contact therewith, means for selectively heating said platen to a temperature at least equal to the curing temperature of said adhesive and for cooling said platen to a temperature sufficient to solidify said adhesive after curing thereof, rigid particle retaining means disposed on said platen about said member, a multiplicity of free-flowing balls loosely disposed within said particle retaining means and adapted to be in direct surface contact with said member and said thin sheet and with each other, the number of balls being sufficient to form a layer which completely covers the areas of the member and sheet being adhesively bonded together to a depth sufficient to cover said member, a flexible blanket movably mounted so that one side thereof completely covers said balls and forms with said retaining means and said platen an air tight compartment enveloping said thin sheet, said member and the balls when the blanket is so positioned, the balls being of uniform size and sufficient diameter to permit free gas flow among them, an evacuating means connected to the formed compartment in fluid communication with the spaces between said balls for establishing and maintaining a sub-atmospheric pressure in such spaces and removing the volatiles formed during the curing of the adhesive, said flexible blanket establishing a uniform pressure through the mass of said balls when the formed air tight compartment is evacuated, the volume formed by the masses of said balls being free of reduction when pressure is applied thereto, means forming a further air-tight pressure compartment on the side of said flexible blanket opposite from said balls, and pneumatic compressing means connected to said further pressure compartment for applying super-atmospheric pressure to that side of said blanket opposite the side adjacent the particles, said blanket thereby establishing super-atmospheric pressure to the particle mass equal to the differential pressure across said blanket.

10. In an apparatus for bonding a member to a thin sheet by a layer of pressure temperature curing adhesive interposed therebetween, a rigid firmly supported unitary frame, a rigid support platen supportingly seated only on said frame and having a metallic supporting surface which is of the same configuration as that of the sheet to which the member is to be bonded, said supporting surface being adapted to support said sheet in direct contact therewith, a particle retaining means disposed about said support platen, a multiplicity of free flowing metal balls loosely disposed in said particle retaining means in direct contact with said sheet and said member and with each other, the number of balls being sufficient to completely cover the areas of said member and said sheet to be adhesively mounted together to a depth to cover said member, a flexible blanket movably mounted so that one side thereof completely covers and is in direct contact with said balls to form with said sheet an air-tight compartment surrounding said balls when said blanket is so positioned, an evacuating means connecting to the formed compartment to remove volatiles formed in curing of the adhesive and to establish and maintain a subatmospheric pressure in said air-tight compartment, the flexible blanket thereby establishing a uniform pressure through the mass of said balls when the formed air-tight compartment is evacuated, and heating and cooling means spaced apart from said platen and being in intimate thermal contact with said frame and adapted to selectively heat said sheet, said member and said adhesive layer to the curing temperature of said adhesive and to subsequently cool said adhesive to a solid state while pressure is applied thereto through said balls, said heating and cooling means being arranged relative to said frame and said platen such that all of the heat which is transferred to and from said sheet, said member and said adhesive is transferred by conductance only through the face of said frame and through said platen.

References Cited in the file of this patent

UNITED STATES PATENTS

| | | |
|---|---|---|
| 796,684 | Thomson | Aug. 8, 1905 |
| 1,943,918 | King | Jan. 16, 1934 |
| 2,054,864 | Owen | Sept. 22, 1936 |
| 2,357,867 | Babbitt et al. | Sept. 12, 1944 |
| 2,370,956 | Harkom | Mar. 6, 1945 |
| 2,385,352 | Davis | Sept. 25, 1945 |
| 2,421,101 | Lakso | May 27, 1947 |
| 2,422,979 | Pecker | June 24, 1947 |
| 2,493,439 | Braund | Jan. 3, 1950 |
| 2,512,875 | Reynolds | June 27, 1950 |
| 2,563,218 | Darracott et al. | Aug. 7, 1951 |
| 2,650,185 | Larson et al. | Aug. 25, 1953 |
| 2,700,632 | Ackerlind | Jan. 25, 1955 |
| 2,722,735 | Beamish | Nov. 8, 1955 |
| 2,742,387 | Giuliani | Apr. 17, 1956 |
| 2,801,947 | Winchester et al. | Aug. 6, 1957 |
| 2,835,004 | Whitesell | May 20, 1958 |
| 2,849,758 | Plumley et al. | Sept. 2, 1958 |

FOREIGN PATENTS

| | | |
|---|---|---|
| 392,952 | Great Britain | May 22, 1932 |
| 401,276 | Great Britain | Nov. 6, 1933 |
| 689,165 | France | May 26, 1930 |